Feb. 10, 1931.  E. ALTENBURG  1,791,994
ILLUSTRATING APPARATUS
Filed June 3, 1926

Inventor
Edgar Altenburg
By Hardway Cathey
Attorney

Patented Feb. 10, 1931

1,791,994

UNITED STATES PATENT OFFICE

EDGAR ALTENBURG, OF HOUSTON, TEXAS

ILLUSTRATING APPARATUS

Application filed June 3, 1926. Serial No. 113,578.

This invention relates to new and useful improvements in an illustrating apparatus.

One object of the invention is to provide an educational apparatus designed for use in illustrating the formation of images of objects on a screen.

Another object of the invention is to provide an apparatus designed for the purpose of delineating the image of an object on a screen by the use of a cellular structure, in association with the screen, whereby only certain rays of light reflected from the object are permitted to reach the screen.

A further feature of the invention resides in the provision of an apparatus of the character described specially designed for use in teaching biology, and is illustrative of certain features of the eye formation of certain forms of animal life.

With the above and other objects in view this invention has particular relation to certain novel features of construction, operation and arrangement of parts, an example of which is described in this specification and illustrated in the accompanying drawings, wherein:—

Figure 1:
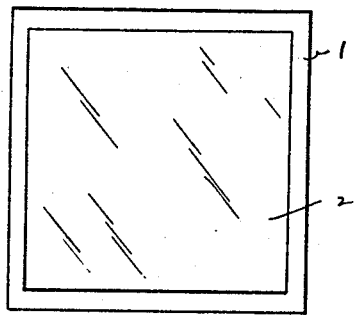
Figure 1 shows a front elevation of the casing.
Figure 2:
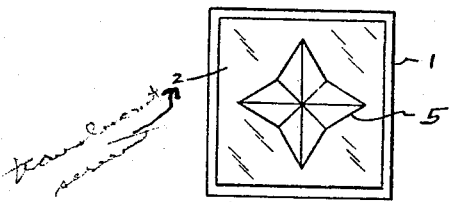
Figure 2 shows a front elevation with the reflecting object in front thereof.
Figure 3:
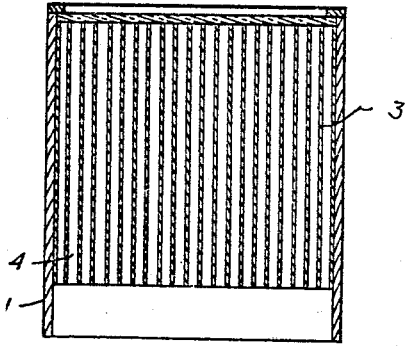
Figure 3 shows a horizontal sectional view.
Figure 5:
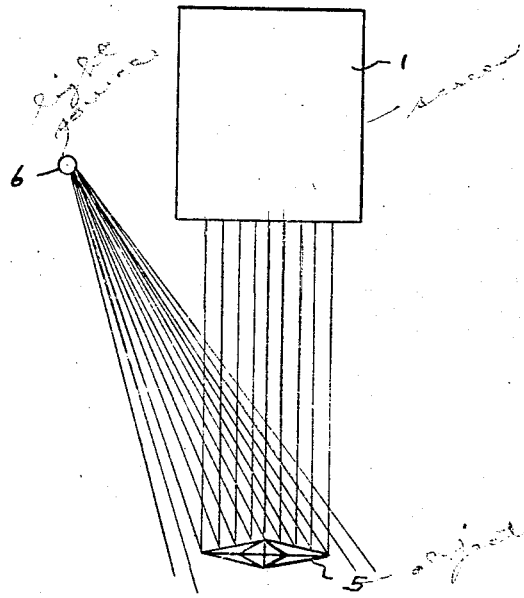
Figure 5 shows a plan view of the apparatus, and associated reflecting object and source of light.
Figure 4:
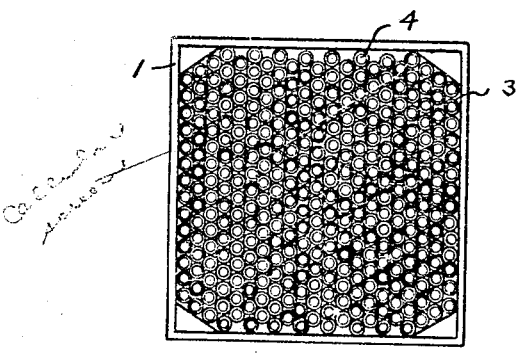
Figure 4 shows a front elevation with the cellular structure therein.

Referring now more particularly to the drawings, wherein like numerals of reference designate similar parts in each of the figures the numeral 1 designates a suitable casing preferably having opaque side walls, top and bottom. The rear wall 2, of the casing, forms a translucid screen and may, for convenience, be formed of frosted glass. This screen corresponds to the retina of the eye. The front of the casing is open, or if desired may have a transparent pane therein.

Within the casing there is a cellular structure 3 having a plurality of substantially parallel light passageways 4 therethrough, from front to rear.

The apparatus is designed to be used in a dark room, and in use an object 5, whose image is to be delineated on the screen 2, is placed in front of the apparatus and a light 6 is arranged alongside the casing in such a position that only rays of light reflected from the object will pass through the passageway 4 and onto the screen 2. The image of the object will thus be outlined on the screen.

As heretofore stated this apparatus has been specifically designed for use in illustrating certain features of the formation and mechanism of operation of the eye of certain forms of animal life in giving instruction in biology. The apparatus shown is not intended to be, nor is it, an exact model of the eye formation of any known insect, but the apparatus is intended for illustrating the mechanism of image formation by the eye of certain forms of insect life. The apparatus as illustrated shows the structure of the insect eye only in regard to the structure of the parts essential to image formation, namely the long tubular elements known as ommatidia which in the drawing of the apparatus, are represented by the cellular structure 3 with the long substantially parallel light passageway 4 therethrough. In the actual eye of certain insects, these tubular elements are hexagonal in cross section, tapering towards their inner or attached ends, and having a lens at their outer ends. But since none of these details are very essential to image formation in the actual eye, they have not been illustrated in the drawing only absolutely necessary features for image formation by the insect eye having been illustrated.

By the use of a sensitized film inside of, or in association with the screen, the apparatus may be adapted for photographic purposes.

What I claim is:—

1. An apparatus for illustrating image formation by the compound eye including a cellular structure formed with substantially parallel, unobstructed, light passageways and a screen disposed to cut the axial lines of said passageways.

2. An apparatus for illustrating image formation by the compound eye including a cellular structure formed with substantially parallel, unobstructed, light passageways and a translucid screen associated with said structure and formed to receive an image, and disposed transversely across the axial lines of said passageways.

3. An apparatus for illustrating image formation by the compound eye including a casing having a translucid wall forming an image receiving screen and a cellular structure within the casing and formed with substantially parallel light passageways disposed in substantially right angular relation to said screen.

4. An apparatus for illustrating image formation by the compound eye including a cellular structure, a screen associated with said structure said structure having a plurality of elongated light passageways whose longitudinal axes are disposed angularly with respect to the screen surface to permit the reception of a selected group of light rays, from an object in front of the apparatus, through said passageways, by said screen, so as to form an image on the screen.

5. An apparatus for illustrating image formation by the compound eye including an image receiving screen having a substantially plane surface and a cellular structure associated therewith, and having elongated light passageways so arranged that the axial lines of said passageways will be intercepted by the screen surface.

In testimony whereof I have signed my name to this specification.

EDGAR ALTENBURG.